United States Patent [19]
Munninger et al.

[11] Patent Number: 5,962,098
[45] Date of Patent: Oct. 5, 1999

[54] RELEASE LINER

[75] Inventors: Wilhelm Munninger, Thansau; Hans Wattendorf, Rosenheim, both of Germany

[73] Assignee: Assidoman Inncoat GmbH, Germany

[21] Appl. No.: 08/749,201

[22] Filed: Nov. 14, 1996

[30] Foreign Application Priority Data

Nov. 23, 1995 [DE] Germany ............................ 195 43 653

[51] Int. Cl.$^6$ ..................................... A61F 13/02
[52] U.S. Cl. ..................... 428/41.3; 428/145; 428/352; 428/511; 428/513; 428/537.5
[58] Field of Search .................................. 428/41.3, 145, 428/352, 511, 513, 537.5

[56] References Cited

U.S. PATENT DOCUMENTS 5,275,855   1/1994   Kubayashi et al. ....................... 428/40

FOREIGN PATENT DOCUMENTS 0483 381A1   5/1992   European Pat. Off. .

OTHER PUBLICATIONS

World–Patent–Index Referat–NR. 86–10 45 30, Mar. 1992.

*Primary Examiner*—Melvyn I. Marquis
*Attorney, Agent, or Firm*—Galgano & Burke

[57] ABSTRACT

The release liner has a flat base substrate which coated on both sides with thermoplastic polyolefin. On one side, the base substrate has a release coating which forms a release force to adhesives. On the other side, the base substrate has a polymer-bound mineral particle layer.

18 Claims, 1 Drawing Sheet

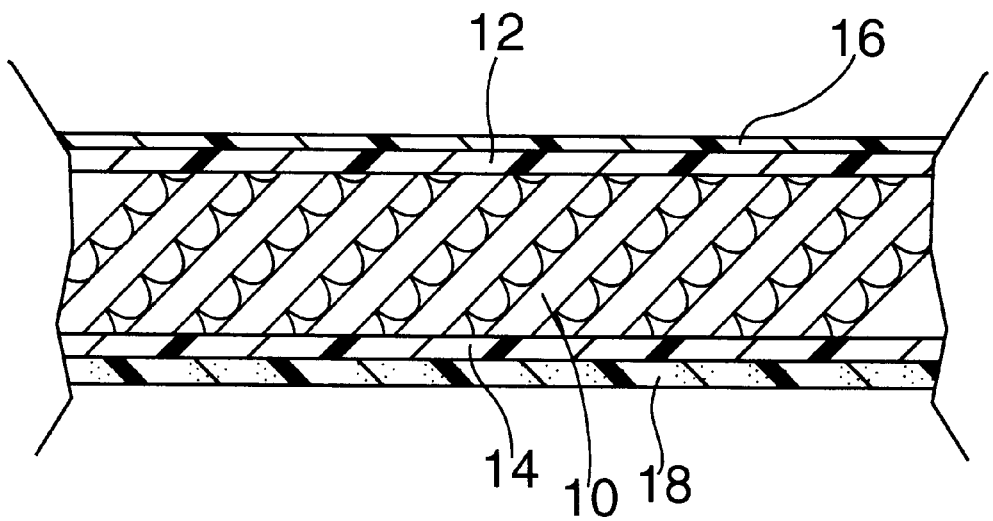

RELEASE LINER

The invention relates to a release liner with a flat base substrate coated on both sides with thermoplastic polyolefin and having a release coating on one side which forms a release force to adhesives.

Such release liners are known from practice. They serve to cover a layer of adhesive on a sticker, for example one made of paper, cardboard or plastic film. The sticker can be pulled off the release liner and made to adhere elsewhere, using the adhesive.

The base substrate of a release liner generally consists of paper. Therefore, the term used in practice is generally release paper. However, the base substrate can also consist of a plastic film.

Usually, dimethyl siloxane systems—called silicones— are applied on the surface of the base substrate as the release coating, in a homogeneous distribution. Silicone application takes place from an aqueous or organic solvent phase or, in the case of silicones with an oily consistency, without solvent, in amounts of approximately 0.3 $g/m^2$ to approximately 1.5 $g/m^2$.

In order for the release properties of the silicones to be fully effective, it is important that the silicones remain on the surface of the substrate during silicone application, and do not migrate into the substrate. For this reason, substrates (base papers) with a smooth, closed, highly non-absorbent surface are used, particularly supercalendered papers, clay-coated papers and papers coated on one or both sides with polyolefins (liners).

After silicone application, the base substrate is laminated with adhesive and the sticker material. Further processing of the laminate takes place in the form of rolled goods or primarily in the form of format goods, particularly cut-outs obtained by punching.

The sticker is frequently a print carrier. In addition, special films, e.g., cast films, and reflective films composed of several layers should be mentioned.

Frequently, the laminates are imprinted during the course of their further processing. In this connection, significant problems can occur due to heat effects, for example when drying screen printing inks or when passing through a laser printer.

The laminates demonstrate shrinkage, a tendency to curl, and waviness at the edges, all of which cause problems particularly if there are several printing passes, or make these passes impossible. Another problem is also blocking, i.e., adhesion of laminates which are in contact with one another, and can no longer be individually picked up by suction lifters, but rather are lifted as a block.

Laminates with base substrates (release papers) which are coated with thermoplastic polyolefin on both sides are characterized by excellent dimensional stability. The polyolefin coating prevents a water exchange with the base substrate if the ambient climatic conditions change. The dimensional change of the laminates in the relevant crosswise direction is 0.2% to 0.5% if the relative humidity is raised from 40% to 80% and reduced back to 40%. In contrast, values of 1% to 3% are measured for laminates with an uncoated base paper. The good dimensional stability of the laminates means low shrinkage, little tendency to curl, little waviness at the edges, and therefore good suitability for imprinting.

Base substrates coated with thermoplastic polyolefins have the disadvantage, however, that they are able to withstand less thermal stress than uncoated substrates.

The melting point of the polyolefins lies between 105° C. (LD polyethylene; low density polyethylene; polyethylene with low density; soft polyethylene) and 140° C. (polypropylene). Initial melting and changes in the shininess and the surface structure are possible.

The residual moisture of 4% by weight to 8% by weight introduced into the raw paper under controlled conditions explosively develops steam if heated suddenly. Undesirable bubbles can occur at the polyolefin surface.

Restrictions already exist for silicone application to the base substrates coated with thermoplastic polyolefins, because of their relatively low thermal stress resistance.

Instead of being cross-linked at temperatures of 150° C. to 200° C., they can be cross-linked only at temperatures of 90° C. to 120° C. Depending on the silicone system—cross-linking by condensation or addition, containing solvent or free of solvent, basic formulation or with CRA (controlled release additive; release force regulator)—the degree of cross-linking of the silicone application can differ.

Additional or final cross-linking (post-curing subsequent cross-linking) can be carried out on the base substrate which is present in the form of stacked or rolled goods, while the silicone side of one ply of substrate rests against the back of the adjacent ply, which is coated with polyolefin. The silicones with low molecular weight, which are not cross-linked or only partially cross-linked, migrate onto the back coated with polyolefin. Here, they are not absorbed, but rather stay on the surface of the back. This has disadvantageous effects. The possibility of imprinting the back, for example with a logo, handling instructions, safety information, disposal information, or something similar, is impaired. The friction behavior changes, i.e., the friction during passage through a machine, and slippage occurs in the stack. In the case of laminates present in stacked or rolled form, a silicone transfer from the back of one ply, coated with polyolefin, to the laminate front of the adjacent ply can occur, resulting in changes in the surface. The appearance (shininess and haze) of the laminate front and its imprintability are impaired, and its wetting behavior is changed in undesirable manner.

From EP 0 483 381 A1, a release paper is known which has a layer with mineral particles as the print carrier. The layer is located between the base substrate and the silicone layer.

From U.S. Pat. No. 5,275,855 A, a release liner is known, the base substrate of which has a fine-grained mineral particle layer, which allows good imprinting. Primarily, this relates to imprinting of the substrate front, which carries the silicone layer. However, there is also a fine-grained mineral particle layer on the back of the substrate.

From World Patent Index Reference No. 86-104530 relating to JP 61-049843-A, a release liner with a substrate of inorganic material, containing cellulose fibers and fine-grained inorganic powder, is known. Obviously this relates to powder filling of the cellulose substrate.

It is the object of the invention to create a release liner with a base substrate coated on both sides with thermoplastic polyolefin, which substrate will withstand greater thermal stress and can be written on or imprinted on the back, without problems, and does not tend to undergo changes in friction behavior, or to experience blocking.

This object is accomplished with a release liner of the type described initially, which has the release coating on one side of the base substrate coated with polyolefin, and a polymer-bound mineral particle layer on the other.

BRIEF DESCRIPTION OF THE DRAWING

The drawing is a cross-sectional view of the separation layer carrier embodying the present invention.

As shown in the drawing, the separation layer carrier of the present invention includes a flat base substrate 10 coated on both sides with a thermoplastic polyolefin layer 12, 14 and a with separation layer 16 which forms a separation relative to adhesives on one side, and a polymer-bound mineral particle layer 18 on the other side.

The polymer-bound mineral particle layer covers the polyolefin layer on the back of the base substrate. It allows writing on the back of the base substrate, which is coated with polyolefin, using ink or pencil, and imprinting of the back by means of any conventional printing method. By means of cross-linking the polymers, a surface with essentially thermal resistance properties is obtained, and this surface can withstand much greater thermal stress than the polyolefin. Furthermore, the surface has paper-like absorption properties for non-cross-linked or partially cross-linked silicones with low molecular weight, which migrate from an adjacent ply of the release liner, which is present in the form of stacked or rolled goods. Because of the absorption of the silicones, their transfer to an adjacent laminate surface is prevented, and a low tendency towards changes in the friction behavior and towards blocking is achieved.

Laminates with the separation layer carrier according to the invention have excellent dimensional stability under changing ambient climatic conditions. This is primarily and sufficiently due to the barrier effect of the polyolefin coating on both sides, preventing water exchange with the base substrate.

It is preferable if the polymer-bound mineral particle layer covers the polyolefin layer on the back of the base substrate over its entire area.

The thickness of the polymer-bound mineral particle layer is preferably $1\mu$ to $5\mu$. This unusually small layer thickness is one of the determining factors for the paper-like surface properties of the layer.

The mineral component of the polymer-bound mineral particle layer preferably consists of pigment, particularly kaolin, chalk, silicon dioxide. A preferred kaolin pigment is China Clay. Slurry is a possible chalk pigment. The silicon dioxide pigment can be precipitated silicon dioxide or aerosil.

By means of suitable pigment mixtures, transparency, opacity, or a coloring of the polymer-bound mineral particle layer which can be understood as a compromise between the two can be achieved. Transparency is desirable in order to make imprinting such as a logo, handling instructions, safety information, or disposal information on the back of the base substrate clearly visible and legible. Opacity is desirable for good contrast when writing on or imprinting the polymer-bound mineral particle layer.

The polymer component of the polymer-bound mineral particle layer according to the invention is formed by polymer/pigment binder systems which can be cross-linked. A styrene/acrylate polymer or an acrylate copolymer is preferred.

The preparation for the polymer-bound mineral particle layer can contain polymers which support the absorption of water-soluble printing ink, or ink soluble in organic solvents, particularly polyvinyl pyrrolidone. A proportion of polymer which supports absorption is preferred for applications in which the ability to write on or imprint the polymer-bound mineral particle layer stands in the foreground.

In a wiping test with test ink according to DIN 53126, it was possible to reduce the drying speed from approximately 400s to between 80s and 90s, by using a proportion of polyvinyl pyrrolidone. As a comparison: writing paper required a drying time of 40s to 50s.

Other possible components of the preparation for the polymer-bound mineral particle layer are cross-linking agents, particularly polyisocyanate, pigment distribution agents (wetting agents, especially surfactants), anti-foaming agents and anti-static agents.

The formulation of two preparations for the polymer-bound mineral particle layer is given in detail below.

Formulation 1

| | | |
|---|---|---|
| 40 to 70% by volume | water |
| 15 to 30% by volume | styrene/acrylate polymer (on dispersion basis) |
| 20 to 40% by volume | kaolin (China Clay) |
| 0.2 to 0.5% by volume | pigment distribution agent |
| 0.1 to 0.5% by volume | anti-foaming agent |
| 1 to 3% by volume | anti-static agent |

Formulation 1 belongs to a thermal protection lacquer. When using this formulation, heat protection of the polyolefin surface stands in the foreground. In addition, not only is it possible to write on or imprint the layer to a certain degree, but also, it tends not to undergo changes in friction behavior, and to avoid blocking and silicone absorption.

Formulation 2

| | |
|---|---|
| 40 to 70% by volume | water |
| 5 to 15% by volume | acrylate copolymer (on dispersion basis) |
| 0.2 to 0.4% by volume | polyisocyanate |
| 1 to 5% by volume | polyvinyl pyrrolidone (aqueous) |
| 10 to 30% by volume | chalk (Slurry) |
| 5 to 10% by volume | silicon dioxide (precipitated $SiO_2$ aerosil) or |
| 5 to 10% by volume | kaolin (China Clay) |
| 0.2 to 0.5% by volume | pigment distribution agent |
| 0.1 to 0.5% by volume | anti-foaming agent |

Formulation 2 belongs to a printing lacquer. When using this preparation, the ability to write on and imprint the polyolefin surface stands in the foreground.

The preparations are an aqueous liquor which can be variably adjusted over a broad range with regard to solids content and viscosity, and can therefore be applied using practically any conventional application methods which result in a uniform application of lacquer, as smooth as possible (texture-free), at $1 \text{ g/m}^2$ to $5 \text{ m/g}^2$. As examples, application using an air-brush application system, gravure roller application system (rotogravure printing press), or reverse roll coater (accugravure system) can be mentioned.

What is claimed is:

1. A release liner comprising:
    a generally flat base substrate having a first side and a second side;
    a layer of thermoplastic polyolefin coated to each of said first and second sides of said base substrate;
    a release coating providing release against pressure-sensitive adhesives applied to said layer of thermoplastic polyolefin coated to said first side; and
    a polymer-bound mineral layer applied to said layer of thermoplastic polyolefin coated to said second side, and wherein said polymer-bound mineral layer has a thickness from 1 $\mu$m to 5 $\mu$m.

2. A release liner according to claim 1, wherein said polymer-bound mineral particle layer covers the entire surface of the polyolefin coating to which the polymer-bound mineral particle layer is applied.

3. A release liner according to claim 1, wherein said polymer-bound mineral particle layer comprises a mineral component comprising pigment.

4. A release liner according to claim 3, wherein said pigment is kaolin.

5. A release liner according to claim 3, wherein said pigment is chalk.

6. A release liner according to claim 3, wherein said pigment is silicon dioxide.

7. A release liner according to claim 1, wherein said polymer-bound mineral particle layer is transparent.

8. A release liner according to claim 1, wherein said polymer-bound mineral particle layer is colored.

9. A release liner according to claim 1, wherein said polymer-bound mineral particle layer is opaque.

10. A release liner according to claim 1, wherein said polymer-bound mineral particle layer comprises a cross-linkable polymer component comprising a member selected from the group consisting of a styrene/acrylate polymer and an acrylate copolymer.

11. A release liner according to claim 1, wherein said polymer-bound mineral particle layer is produced by application of an aqueous liquor.

12. A release liner according to claim 11, wherein said formulation contains a polymer which supports the absorption of water-soluble printing ink, or ink soluble in organic solvents.

13. A release liner according to claim 12, wherein said formulation includes polyvinyl pyrrolidone.

14. A release liner according to claim 11, wherein said formulation includes a cross-linking agent.

15. A release liner according to claim 14, wherein said formulation includes polyisocyanate.

16. A release liner according to claim 11, wherein said formulation includes a pigment distribution agent.

17. A release liner according to claim 11, wherein said formulation includes an anti-foaming agent.

18. A release liner according to claim 11, wherein said formulation includes an anti-static agent.

\* \* \* \* \*